United States Patent [19]

Wolfkamp

[11] 4,156,226
[45] May 22, 1979

[54] TRANSDUCER ASSEMBLY

[75] Inventor: Albertus Wolfkamp, Canoga Park, Calif.

[73] Assignee: Edcliff Instruments, Monrovia, Calif.

[21] Appl. No.: 879,043

[22] Filed: Feb. 21, 1978

[51] Int. Cl.² .......................................... H01L 10/10
[52] U.S. Cl. .......................................................... 338/41
[58] Field of Search .............. 338/41, 4; 73/725, 729, 73/719

[56] References Cited

U.S. PATENT DOCUMENTS

| | | | |
|---|---|---|---|
| 2,724,760 | 11/1955 | Giannini et al. | 338/41 |
| 2,886,679 | 5/1959 | Jonke | 338/41 |
| 3,056,934 | 10/1962 | Kyle et al. | 338/41 X |
| 3,136,968 | 6/1964 | Kramer | 338/41 |
| 3,173,120 | 3/1965 | Marks et al. | 338/41 X |
| 3,271,720 | 9/1966 | Hluchan et al. | 73/729 |
| 3,545,274 | 12/1970 | Derr et al. | 338/41 |

Primary Examiner—C. L. Albritton
Attorney, Agent, or Firm—Flehr, Hohbach, Test, Albritton & Herbert

[57] ABSTRACT

Pressure responsive transducer of the potentiometer type having a resistance corresponding to the applied pressure. The transducer is particularly suited for aircraft use and includes a rigid frame fabricated of sheet metal. A pivotably mounted wiper assembly is operably connected to a pressure responsive bellows assembly and makes electrical contact with a resistive element. The wiper assembly includes a shaft with pivots which are received in trunnions which are carried by arms of the frame.

6 Claims, 3 Drawing Figures

U.S. Patent     May 22, 1979     4,156,226
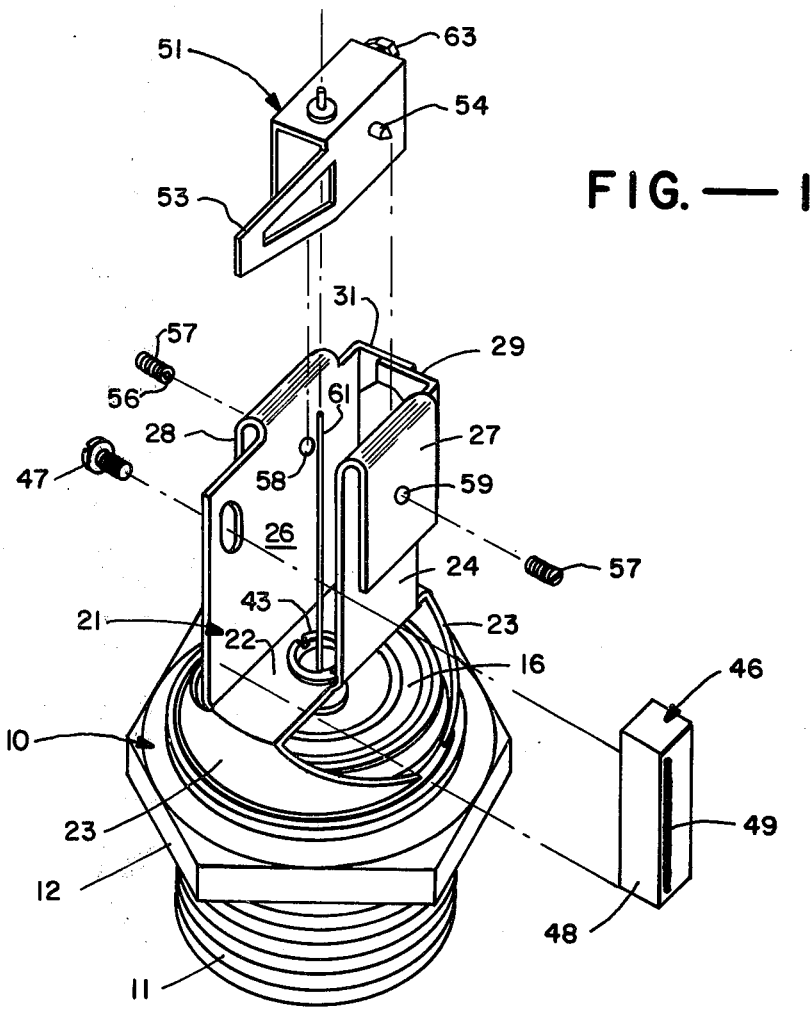
FIG.—1
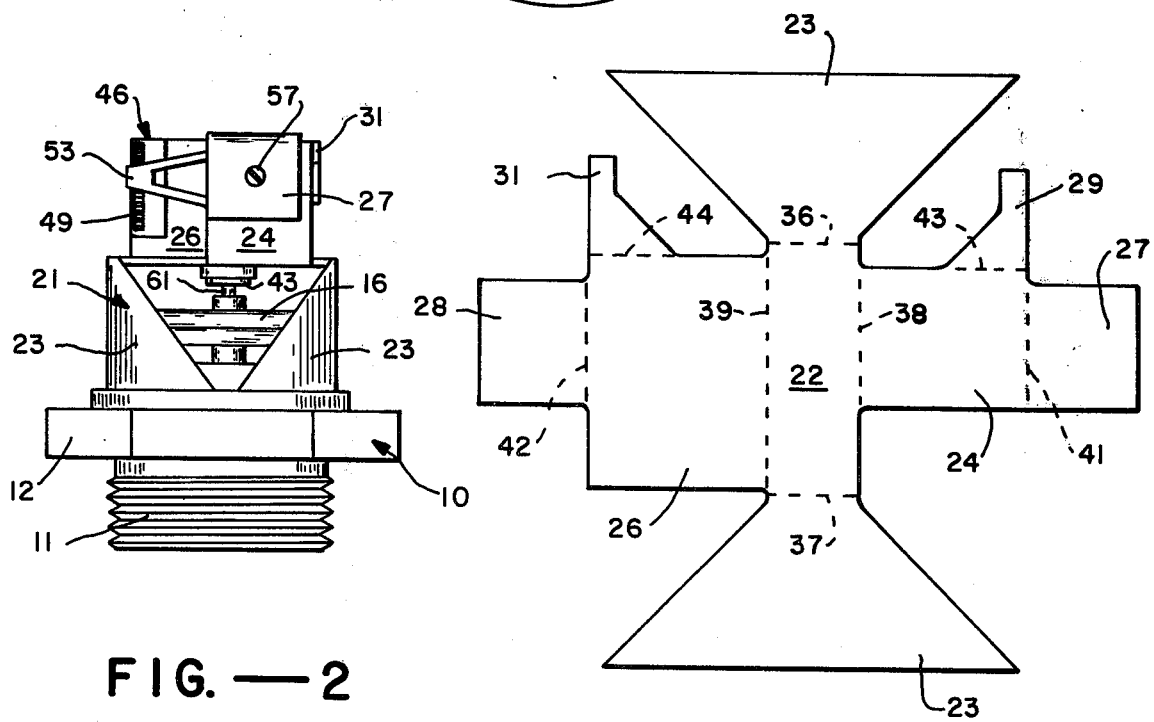
FIG.—2     FIG.—3

TRANSDUCER ASSEMBLY

BACKGROUND OF THE INVENTION

This invention pertains generally to pressure transducers and more particularly to a pressure responsive transducer of the potentiometer type which is suitable for use in applications such as monitoring oil pressure in an aircraft engine.

SUMMARY AND OBJECTS OF THE INVENTION

The transducer assembly of the invention includes a base, a pressure responsive bellows assembly mounted on the base, and a frame having a pair of spaced apart arms extending away from the base. A wiper assembly is pivotably mounted on the arms and makes electrical contact with a resistive element carried by the frame. An operating rod connects the bellows and wiper assemblies so that the position of the wiper assembly corresponds to the pressure applied to the bellows assembly. The frame is fabricated of sheet metal, and the wiper assembly is pivotably mounted in trunnion members mounted in aligned openings in the arms of the frame.

It is in general an object of the invention to provide a new an improved transducer assembly.

Another object of the invention is to provide a transducer assembly of the above character which is suitable for use in monitoring the oil pressure of an aircraft engine.

Additional objects and features of the invention will be apparent from the following description in which the preferred embodiment is set forth in detail in conjunction with the accompanying drawings.

BRIEF DESCRIPTION OF THE DRAWINGS

FIG. 1 is an isometric view, partly exploded, of one embodiment of a transducer assembly according to the invention.

FIG. 2 is a side elevational view of the embodiment of FIG. 1.

FIG. 3 is a top plan view of the frame of the transducer assembly in an unfolded state.

DESCRIPTION OF THE PREFERRED EMBODIMENT

The transducer assembly includes a base 10 having an axially extending threaded stem 11 and a hexagonal flange 12. A cup shaped cover (not shown) in surmounted on the base and therewith forms a sealed chamber in which the remaining components of the transducer are mounted.

A pressure responsive bellows assembly 16 is mounted on the base and has an internal chamber to which the pressure to be monitored is applied via a passageway in the base. In order to isolate the transducer from high frequency variations in the pressure system to which the transducer is connected, a snubber assembly (not shown) can be included in the base. A suitable snubber assembly is described in co-pending application Ser. No. 873,247, filed Jan. 30, 1978 and includes a plurality of baffle plates mounted in a bore in the base. Each of the baffle plates has a shallow cavity of relatively large diameter formed in one surface thereof, with a small opening toward the outer wall of the cavity. The openings in adjacent ones of the plates are diametrically offset to provide a long, narrow passageway with a number of right angle bends. Alternately, the snubber assembly can be formed as a separate unit which is connected between the transducer assembly and the pressure system.

A frame 21 is also mounted on base 10. This frame includes a generally rectangular center section 22 which is spaced above an generally parallel to the upper surface of the base. Generally triangular legs 23 extend downwardly from the ends of the central section and are secured to the base by suitable means such as spot welding. The legs are formed with a cylindrical curvature and embrace the bellows assembly. Arms 24, 26 extend upwardly from the sides of the central section. Ears 27, 28 are folded downwardly from the upper margins of the arms and spaced outwardly from the arms. Tabs 29, 31 extend between the arms and are secured together by suitable means such as spot welding.

The frame is fabricated of sheet metal by a suitable process such as stamping. As stamped, the frame has the flat shape illustrated in FIG. 3. Legs 23 are folded down along lines 36, 37 and formed with the desired cylindrical contour. Arms 24, 26 are folded up along lines 38, 39, and ears 27, 28 are folded down from the upper margins of the arms along lines 41, 42. Tabs 29, 31 are folded inwardly toward each other along lines 43, 44 and secured.

Adjustable means is provided for limiting the travel of bellows assembly 16. This means includes an annular set screw 43 which is threadedly mounted in an opening in the central section of the frame. This set screw is adjusted to abut against the upper hub of the bellows assembly upon a predetermined expansion of the assembly.

A resistive element 46 is mounted on arm 26 of the frame and secured by a screw 47. The resistive element comprises an insulative block 46 on which a coil 49 having a predetermined resistance per unit length is mounted.

A wiper assembly 51 is pivotably mounted between the arms of the frame and makes electrical contact with resistive element 49. The wiper assembly comprises a generally rectangular body 52 with a protruding arm 53 which engages coil 49. A short shaft 54 extends transversely through the wiper assembly, and the ends of the shaft are conically tapered to form pivots. The pivots are received in conical bearings 56 formed in the inner ends of trunnion members 57 which are threadedly mounted in aligned openings 58, 59 in the arms and ears of the frame. The wiper assembly is operatively connected to the bellows assembly by an axially extending operating rod 61.

Means is provided for balancing the wiper assembly to cancel the effects of acceleration in the axial direction. This means includes nuts 63 mounted on a stud which extends from the rear wall of wiper body 52.

Electrical connections are made to the ends of resistive element coil 49 and to wiper 51 by leads which have been omitted for ease of illustration.

Operation and use of the transducer assembly are as follows. Stem 11 is threaded into a suitable opening, for example, in communication with the oil system of an aircraft engine. As the oil pressure increases, bellows assembly 16 expands, moving operating rod 61 and wiper arm 53 in an upward direction. The wiper arm engages coil 49, forming a potentiometer having a resistance corresponding to the pressure applied to the transducer.

It is apparent from the foregoing that a new and improved transducer assembly has been provided. While only one presently preferred embodiment has been described, as will be apparent to those familiar with the art, certain changes and modifications can be made without departing from the scope of the invention as defined by the following claims.

What is claimed is:

1. In a transducer assembly: a base; a pressure responsive bellows assembly mounted on the base; a frame fabricated from a single sheet of rigid material mounted on the base and having a generally planar central section spaced from the base, a pair of legs extending between the central section and base, and a pair of spaced apart arms extending from the central section away from the base; a resistive element mounted on the central section of the frame; a wiper assembly pivotably mounted on the arms of the frame in electrical contact with the resistive element to form a potentiometer; and means operatively connecting the bellows assembly to the wiper assembly whereby the resistance of the potentiometer corresponds to the pressure applied to the bellows assembly.

2. The transducer assembly of claim 1 wherein the wiper assembly includes a shaft having pivots at the ends thereof received in bearings formed in trunnion members carried by the arms of the frame.

3. In a transducer assembly: a base; a pressure responsive bellows assembly mounted on the base; a frame fabricated of sheet metal mounted on the base comprising a generally planar central section spaced from and generally parallel to the base, a pair of legs extending from the central section toward the base, a pair of spaced apart arms extending from opposite sides of the central section away from the base, and ears spaced outwardly from and generally parallel to the arms; a pair of trunnion members mounted in aligned openings formed in the arms and ears of the frame; a resistive element mounted on the frame; a wiper assembly pivotably mounted in the trunnion members in electrical contact with the resistive element, and an operating rod interconnecting the bellows assembly and the wiper assembly.

4. In a transducer assembly: a base; a pressure responsive bellows assembly mounted on the base; a frame formed from a planar sheet of rigid material mounted on the base and having a generally planar central section extending in a direction generally parallel to the base, a pair of legs extending downwardly from the central section to the base, a pair of spaced apart arms extending upwardly from opposite sides of the central section, and ears spaced outwardly and extending downwardly from the upper margins of the arms, with aligned openings formed in the ears and arms; a resistive element mounted on the central section of the frame; trunnion members threadedly mounted in the openings in the ears and arms, a wiper assembly pivotally mounted in the trunnion members and in electrical contact with the resistive element to form a potentiometer; and means operatively connecting the bellows assembly to the wiper assembly whereby the resistance of the potentiometer corresponds to the pressure applied to the bellows assembly.

5. In a transducer assembly: a base; a pressure responsive bellows assembly mounted on the base; a frame fabricated from a planar sheet of rigid material mounted on the base and having a generally planar central section extending in a direction generally parallel to the base, a pair of legs extending downwardly from the central section to the base, and a pair of spaced apart arms extending upwardly from opposite sides of the central section; a resistive element mounted on the central section of the frame; a wiper assembly pivotally mounted on the arms of the frame in electrical contact with the resistive element to form a potentiometer; means operatively connecting the bellows assembly to the wiper assembly whereby the resistance of the potentiometer corresponds to the pressure applied to the bellows assembly; and a set screw carried by the central section of the frame for abutting engagement with the bellows assembly to limit travel of said assembly.

6. The transducer assembly of claim 5 wherein the set screw includes an axial opening and the means connecting the bellows assembly to the wiper assembly includes an operating rod which passes through the opening in the set screw.